United States Patent [19]

Reid

[11] Patent Number: 4,503,723
[45] Date of Patent: Mar. 12, 1985

[54] GATE OPERATOR APPARATUS

[75] Inventor: James B. Reid, Phoenix, Ariz.

[73] Assignee: John Edward Jennings, Scottsdale, Ariz.

[21] Appl. No.: 462,147

[22] Filed: Jan. 31, 1983

[51] Int. Cl.³ .......................... G05G 1/04; F16H 21/44
[52] U.S. Cl. .......................................... 74/96; 74/516; 49/339
[58] Field of Search ................. 74/67, 68, 96, 516, 74/517, 518, 519, 522, 581, 586, 602, 480 R, 506; 49/326, 334, 338, 339, 340, 345; 474/141

[56] References Cited

U.S. PATENT DOCUMENTS

| 383,969 | 6/1888 | McDonald | 49/334 |
|---|---|---|---|
| 484,847 | 10/1892 | Clary | 49/326 |
| 516,681 | 3/1894 | Hall | 49/338 |
| 815,914 | 3/1906 | Evans | 49/345 |
| 2,576,544 | 11/1951 | Smith | 74/480 |
| 3,296,876 | 1/1967 | Fernberg | 74/480 |
| 3,520,210 | 7/1970 | Tarrant | 74/516 |

FOREIGN PATENT DOCUMENTS

| 322144 | 3/1970 | Sweden | 49/334 |
|---|---|---|---|
| 724847 | 3/1980 | U.S.S.R. | 74/469 |

Primary Examiner—Lawrence J. Staab
Attorney, Agent, or Firm—M. David Shapiro

[57] ABSTRACT

The invention comprises a gate or other load operator which provides non-linear torque/angular velocity characteristics over approximately a ninety degree gate travel range wherein the torque/velocity characteristic is reversed for opening and closing. The mechanism, a dual four-bar linkage with slotted pivots, provides high starting torque and lower running torque regardless of whether the gate or load is opening or closing. The mechanism is not constrained to be located on a particular side of the gate post.

20 Claims, 11 Drawing Figures

GATE OPERATOR APPARATUS

FIELD OF THE INVENTION

The invention relates to a dual non-linear four-bar mechanism for transferring an input torque to an output torque such as may be utilized in an automatic gate operator for use in a gate across a private driveway.

BACKGROUND OF THE INVENTION

In prior art gate operator mechanisms, the linkage between the prime energy source, such as an electric motor, and the gate may be non-linear in nature. If the high torque end of the torque characteristic is used, for example, for initiating the opening portion of the cycle, it is not available for the initiation of the closing portion of a complete cycle. Since a much higher starting torque is required to start the relatively large mass of the gate into motion than is required to sustain the motion, the prime energy source must be sized to accommodate the larger starting torque requirement. Motors in the range of nearly a full horsepower may be required to fill the starting torque requirements under these conditions. These motors are relatively expensive and bulky. A typical prior art system which displays these characteristics is the Model AHSG Heavy Duty Swing Gate Opener, manufactured and available from the Stanley Works, 5740 East Nevada Avenue, Detroit, Mich. 48234. This unit utilizes either a ½ or 1 horsepower electric motor as a prime mover, depending upon the size of the swinging gate. There are other models which range down to ⅓ horsepower. All of these prior art systems are designed for mounting on the opening direction side of the swinging gate.

Because of the high currents required to run the large motor required for the prior art mechanism, it has not been feasible to provide battery standby power for those cases where the electrical energy source fails. This has meant that those gates are inoperable during such a power failure; a situation that can be inconvenient, at best, and dangerous in some emergency situations where access to the gated drive may be blocked for an uncertain length of time. Conversely, in prior art gate operator mechanisms, non-linear linkages have provided high torque for initiating both the opening and closing portions of a complete cycle. However, such mechanisms have required that the operator assembly be located next to the side of the gate post toward which the gate is to open. This means that the gate operator must be located outside the secure area when it is desired that the gate open outward. Such prior art operators suffer an additional limitation in that once located, gate rotation can not be changed. That is, a gate which opens outward from the secure area can not be adapted to open into or toward the secure area, and vice versa.

SUMMARY OF THE INVENTION

The above shortcomings and limitations of the prior art gate mechanisms are much reduced by the implementation of the invention. A four-bar non-linear mechanism is described for linking the prime energy source with the gate so that when the gate is first started into motion, a high torque is available to provide the initial thrust and as the gate proceeds into the opening cycle, the torque is reduced while the angular velocity is increased. Without more, the problem described above would prevail upon the initiation of gate closing. The invention provides a solution to this problem by reversing the available torque curve for closing by automatically providing a high beginning torque to initiate the closing cycle of the gate as well as in the opening portion of the cycle. As the gate proceeds in the closing direction, the applied torque is reduced and the angular velocity is increased, just as it is in the opening cycle. This is accomplished by means of what I refer to as a "dual four-bar" mechanism. The enclosed operator mechanism utilizing the "dual four bar" linkage may be installed along either side of the gate post. Once installed, the gate may be rotated into the secure area or away from the secure area by appropriate gate link and electrical polarity choices. At any time subsequent to installation of the operator, the gate link and electrical polarity choices may be reversed if it is desirable to reverse direction of gate operation.

It is therefore, an object of the apparatus of the invention to provide a high starting torque for a loading mass, which is modified to a lower torque, higher velocity, once the mass is urged into a motion cycle, no matter in which of two directions of motion the mass is first urged to move.

It is another object of the invention to provide a clutch mechanism in a non-linear linkage for a mass operator to prevent damage to a load, to the linkage or to any person, animal or other thing which comes into contact with the mass during its motion cycle.

It is still another object of the invention to provide means for damping the motion of a load mass, which is operated by a dual four-bar non-linear linkage apparatus, in order to reduce and/or prevent hunting action in the operating system.

It is yet another object of the invention to provide linkage means between the driving mechanism and the output load, which may be a roadway gate, which passes above or below the output load to avoid having to pierce the load for clearance for the linkage.

It is still a further object of the invention to provide a dual four-bar non-linear linkage apparatus for the operation of a two directional load mass in which each of at least one of the linkage members is pivoted within an elongated slotted configuration so that it is not necessary for the dual four-bar mechanism to comprise a fixed parallelogram.

These and other objects and advantages of the invention will become more readily understood upon the study of the Detailed Description of the Invention, below, taken together with the drawings, in which.

DETAILED DESCRIPTION OF THE INVENTION

Figure 1:
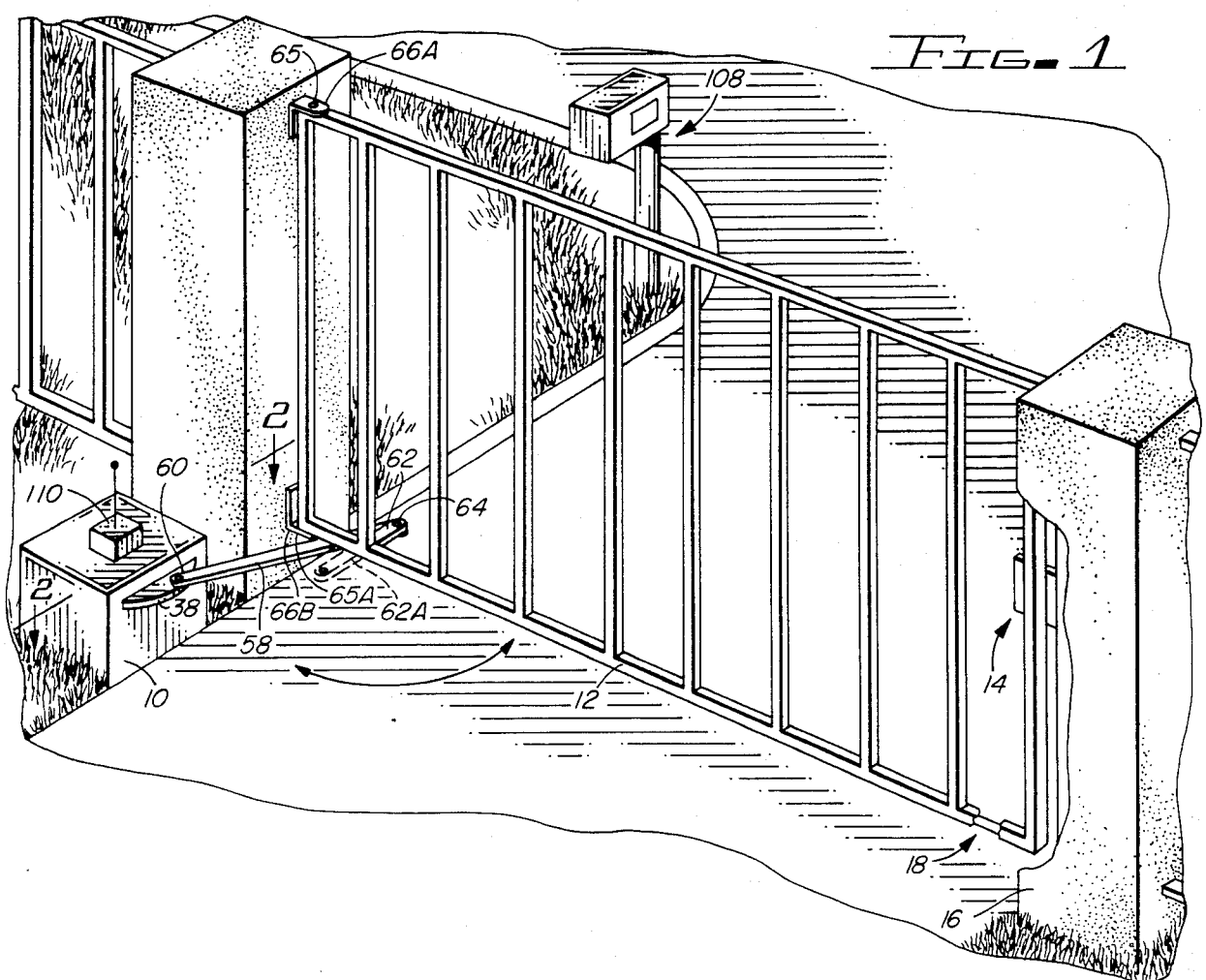
FIG. 1 is a perspective view of a typical gate that is linked to and operated by a preferred mode of the apparatus of the invention wherein the operating linkage of the invention is mounted at ground level.

A preferred embodiment of the invention is shown in FIG. 1. One important use for the apparatus of the invention is for the operation of a powered, automatically operated driveway gate, as shown in FIG. 1. The apparatus is there mounted near, or at, ground level, in contrast to the post mounted embodiment shown in FIG. 7. Returning attention to FIG. 1, it may be seen that a linking and driving apparatus is housed in box or cover 10 at or near ground level. As will be described later, box 10 may be within or without the secure side of gate 12, but as shown in FIG. 1, it is on the secure side of gate 12. Gate 12 is shown in a closed position with magnetic latch 14 securing the closure. The particular electromagnet utilized exerts a latching force of approximately 1500 pounds when it is energized. Control circuits within box 10 are utilized to energize and de-energize magnet assembly 14 as the various opening and closing cycles of gate 12 may require. The latching mechanism is mounted on gate 12, rather than on mating post 16 against which gate 12 closes, so that wires 18 which supply power thereto, may be routed across or within gate 12 to controls (not shown) within box 10 without necessity for burying those wires in the ground. Of course other latching mechanisms may be utilized, for example; mechanical latches which are electrically released or even entirely mechanical latching systems. It is even possible to use the system with no latch at all.

Figure 2:
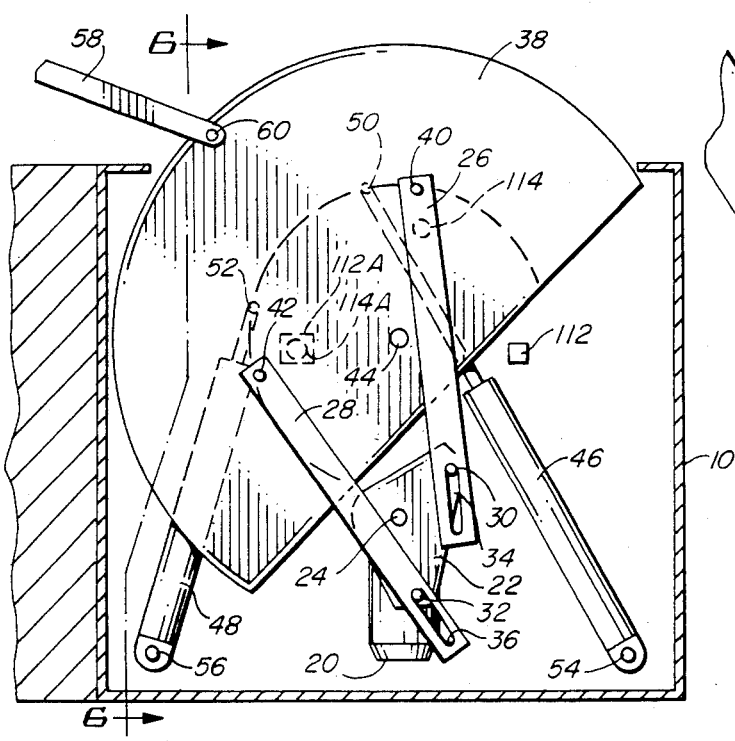
FIG. 2 is a partial top view, taken at 2—2 of the apparatus of the invention of FIG. 1, shown with the output gate in the closed position.
Figure 2A:
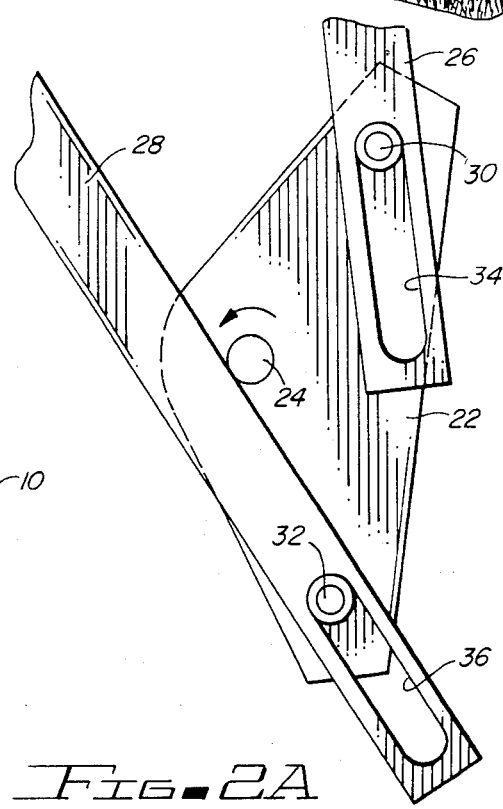
FIG. 2A is an enlarged view of a portion of the mechanism of FIG. 2.

FIG. 2 depicts the operating mechanism of the invention which is mostly enclosed within box or cover 10 of FIG. 1. FIGS. 2A, 3A, 4A and 5A are enlarged views of a portion of FIGS. 2,3,4 and 5, respectively. These larger views depict in more detail the relationships between slot 34 of linkage bar 26 and the slideably engaged pivot bearing 30, and the corresponding relationship between slot 36 of linkage bar 28 and the slideably engaged pivot bearing 32. Bearings 30 and 32 are free to rotate about their pivot axes which are each fixed to input arm 22, as shown. They are also restrained within elongated slots 34 and 36 of arms or bars 26 and 28 respectively. In FIG. 2, input motor 20 and clutch (not shown) is shown (and discussed further in connection with FIG. 6, below). The output torque from motor 20 and the clutch is coupled to dual input member 22. Dual input member 22 pivots on pivot point 24 and is rotatable in either direction thereabout by means of the aforementioned output torque from motor 20. Linkage bars or elements 26, 28 are coupled to input member 22 by means of pivot points 30 and 32 which are affixed to member 22. Pivot points 30 and 32 are slidingly engaged within slots 34 and 36 of linkage members 26 and 28, respectively.

The opposite ends of linkage bars 26 and 28 are pivoted on disk member 38 by means of pivot points 40 and 42. All of the pivot points 30, 32, 40 and 42, along with other pivot points in this system as described herein, may comprise bearings or other anti-friction mechanisms, as will be well understood by one of ordinary skill in this art. Disk member 38 is the output member of the mechanism and is pivoted on and is rotatable about pivot point 44. Pneumatic dampers 46 amd 48 are coupled to disk 38 by means of pivot points 50 and 52, respectively. The other end of each of dampers 46 and 48 are pivoted at pivot points 54 and 56, respectively, to fixed points on a base plate within box cover 10. In the preferred mode of the mechanism of the invention, the dimension between pivot 44 and the circle which intersects pivots 40, 42, 50 and 52 on disk 38 is 5.43 inches. The corresponding dimension between pivot point 24 of input member 22 and pivot points 30 and 32 on input member 22 is 2.75 inches. These dimensions were chosen for the particular application and they may be altered for other applications to provide desired or required torque characteristics for a given application. It must be noted that slots 34 a nd 36 on bars 26 and 28 are engaged at their inboard extremes with pivot bearing points 30 and 32. (See also, FIG. 2A.) This arrangement provides for minimum backlash problems upon startup of the input power to the system. It should also be noted that FIG. 2, as stated above, shows the mechanism utilized in a gate operator with the gate in the closed position.

Linkage member 58 is coupled at one end to disk 38 by means of pivot point 60. At the other end, linkage member 58 is coupled to gate extension member 62 at pivot point 64. (See FIG. 1.) Gate extension member 62 is fixed to gate 12 on the outside of the secured area and member 58 may either pass below gate 12, as shown, or through a suitable open space within gate 12. Gate 12 pivots at points 65, 65A on gate post assembly 66A, 66B. For convenience in design, the horizontal projected dimension from gate pivot point 65A to pivot point 64 is selected to be the same as the dimension from disk 38 pivot point 44 (see FIG. 2) to pivot point 60 on disk 38. These dimensions are approximately 10 inches in the embodiment shown. The dimensions described provide for pivot points 60 and 64 to travel equal radius arcs in operation, thereby providing for one for one translation of rotary motion and torque in disk 38 and gate 12. (Straight lines drawn in a projected horizontal plane between pivot points 60, 44, 65A, 64 and back to point 60 describe a variable parallelogram.) Therefore, it will be understood that in the embodiment of the invention shown in FIGS. 2-5, disk 38 rotates through 90 degrees as does gate 12. With the dimensions as described, input dual member 22 rotates through approximately 150 degrees to produce the 90 degree gate 12 motion. But the reader should note that the torque ratio is variable within the rotational ranges because the linkage system is non-linear.

Figure 3:
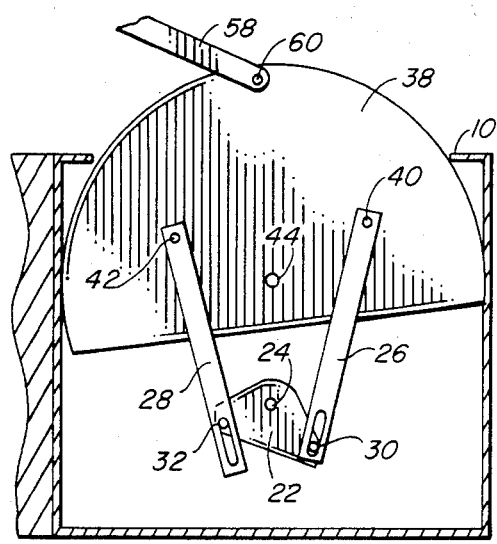
FIG. 3 is a partial top view, taken at 2—2 of the apparatus of the invention of FIG. 1, shown with the output gate in the (approximately) half open position.
Figure 3A:
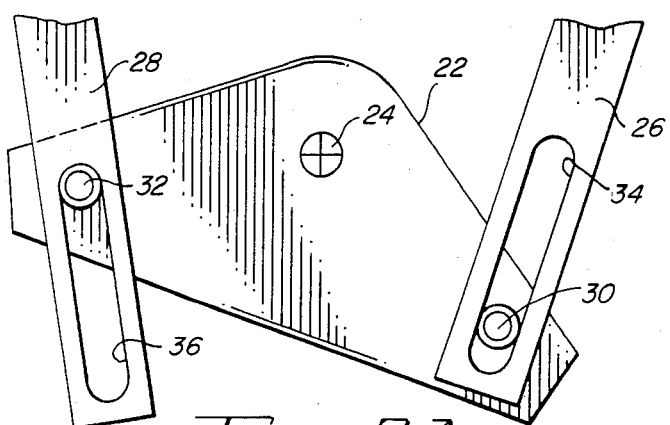
FIG. 3A is an enlarged view of a portion of the mechanism of FIG. 3.

To better understand the system in operation, the reader is now directed to FIG. 3 wherein the gate is shown in a half open position; having reached that point from a closed starting position. It will be noticed that the driving point on input member 22 is pivot 24. Pivot 30 is disengaged from the inboard end of linkage member 26 and has no affect on the system. It may be seen, then, that a single classic four-bar linkage comprising input member 22, linkage member 28 and disk or output member 38 is providing the torque translation for the system during the opening of gate 12 cycle. Looking back for the moment at FIG. 2, it will be seen that the effective length of the input driving arm is very short at the start; the driving radius between points 24 and 32 as adjusted by the angle between these points and the driven linkage bar 28. The effective radius on the output member is the radius between pivots 42 and 44, again as adjusted by the angle between the line between points 42 and 44 and linkage bar 28; this is relatively long. The effective torque ratio is highest at this starting point in the operation cycle and the angular velocity of the gate is at a minimum. Now compare FIG. 2 with FIG. 3. The gate is now half open (in FIG. 3). The effective length of the input arm is longer than it was in FIG. 2 because of the rotation of member 22 and the accompanying change in angle between driving arm 22 and linkage bar 28. The effective length of output arm 42-44 has been shortened because of the change in angle there. The torque ratio is reduced from that of FIG. 2 and there is a corresponding increase in the angular velocity of the gate. As gate 12 approaches the full open position of FIG. 4, the torque ratio is going toward a minimum, but the decrease in torque is slowing and the angular velocity is no longer increasing at a fast rate, but is on a flatter part of the angle vs. velocity curve. As gate 12 approaches the full open position shown in FIG. 4, pivot point 30 approaches contact with the inboard end of slot 34. (See also, FIG. 4A.) At the full open position, pivot point 30 is in contact or near contact with the inboard end of slot 34. Notice that pivot point 32 has stayed in full contact with the inboard end of slot 36 throughout the opening cycle, and, as before stated, provides all of the driving force during the opening cycle.

Figure 4:
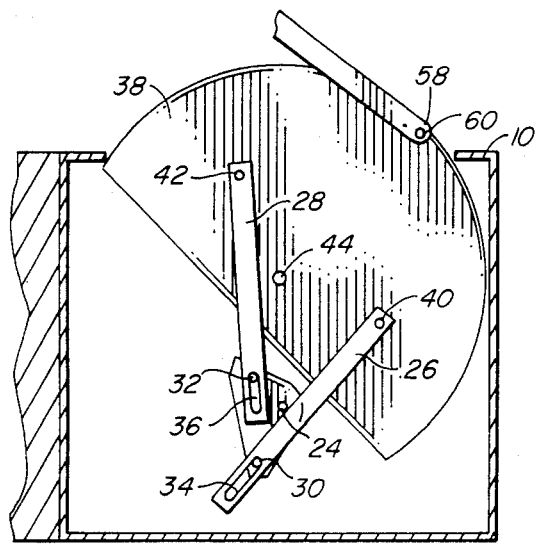
FIG. 4 is a partial top view, taken at 2—2 of the apparatus of the invention of FIG. 1, shown with the output gate in the full open position.
Figure 4A:
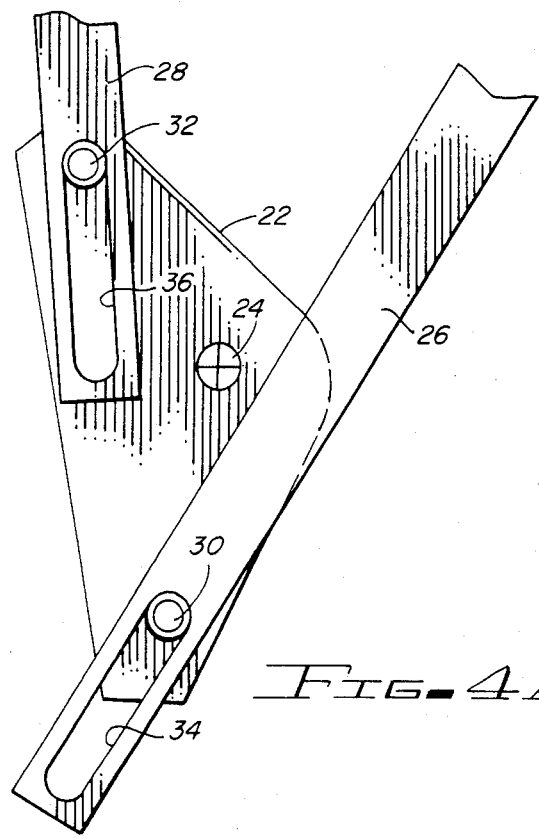
FIG. 4A is an enlarged view of a portion of the mechanism of FIG. 4.
Figure 5:
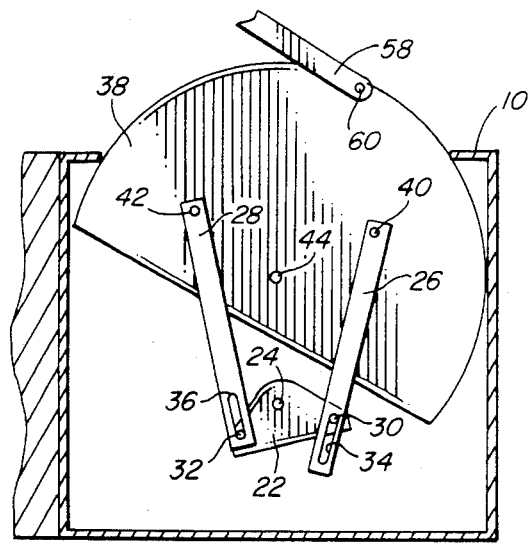
FIG. 5 is a partial top view, taken at 2—2 of the apparatus of the invention of FIG. 1, shown with the output gate in the (approximately) half closed position.
Figure 5A:
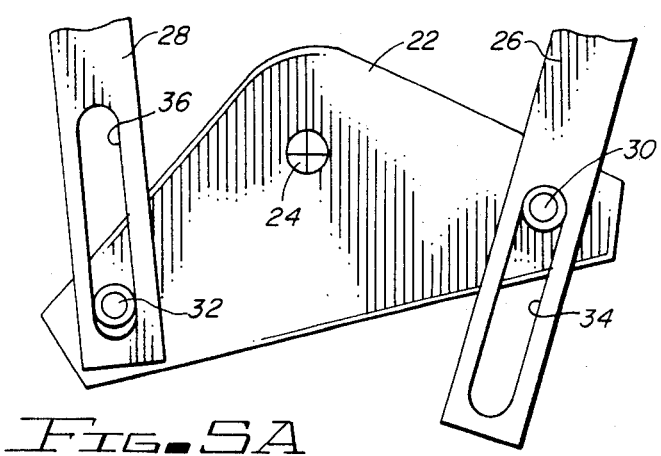
FIG. 5A is an enlarged view of a portion of the mechanism of FIG. 5.

Once gate 12 is in the full open position of FIG. 4, it is ready for the initiation of a closing cycle. The driving motor 20 (see FIG. 6) is reversed and the cycle begins from the position shown in FIG. 4. The driving point on input member 22 is point 30. As soon as motion begins, pivot point 32 moves away from the inboard end of slot 36 of linkage bar 28 and is no longer of any affect. (See also, FIGS. 4A and 5A.) Only linkage bar 26 is operational. The effective arm length of input member 22 is very short, the effective arm length of output member 38 is much longer, as may be seen from FIG. 4. The torque ratio is again high and the angular velocity of the gate is relatively low. The dual four-bar linkage is working to provide the necessary high torque for the initiation of the closing cycle of the gate. As gate 12 approaches the half closed (having started from the full open position of FIG. 4) position of FIG. 5, it may be seen that the effective arm lengths have again been modified to decrease output torque and increase gate 12 angular velocity. As gate 12 approaches the full closed position (see again, FIG. 2) both torque and velocity curves have flattened and become more nearly constant, as was the case when the gate was approaching the full open position of FIG. 4 during the opening cycle. The arrangement described herein, therefore, provides equal or near equal torque-velocity characteristics through both opening and closing cycles. Specifically, the configuration taught herein provides essentially the same torque-velocity characteristics from start to stop whether the gate, or other load, is rotated from an open or from a closed position or whether rotated clockwise or counter-clockwise.

The mechanism of the invention is provided with magnetic limit switches 112 and 112A (see FIG. 2) and corresponding magnets 114, 114A which sense the position of output member or disk 38 which, in turn, is directly synchronized with the position of gate 12, even if clutch 68 (see FIG. 6) slips in operation.

The invention, as described above in connection with a gate, may be utilized quite easily on a left or right handed gate. It may also be utilized with a gate which opens either into the secured area or away from the secured area. The first change required by the system, as taught, comprises the simple expedient of changing the mounting position of gate extender 62 on gate 12. This change is shown in FIG. 1, for example, by the dotted line depiction of gate extender member 62A on the opposite side of the gate, of course bar 58 would be pivoted thereto. The second change requires changing the polarity of the motor drive control (not shown).

It should be noted that while the preferred embodiment of the invention has been shown with slotted ends 34 and 36 of linkage bars 26, 28 engaged at input member 22 pivot points 30, 32, the system of the invention would operate equally well with the slotted ends reversed; i.e., with slotted ends 34, 36 engaged with pivot points 40, 42 on output member 38.

Figure 6:
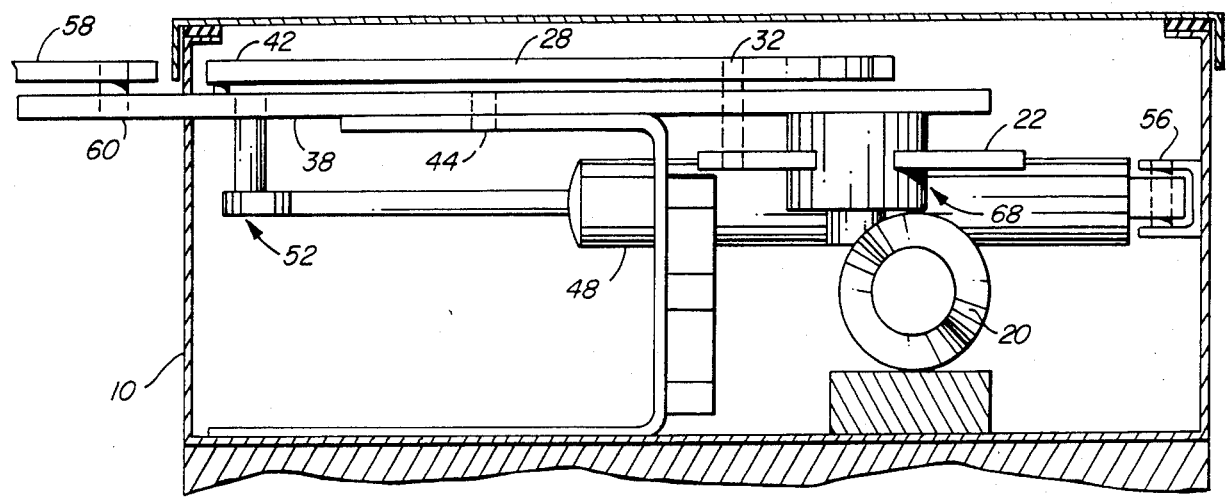
FIG. 6 is a side view of the apparatus of the invention as taken from 6—6 in FIG. 2.

FIG. 6 shows a side view of the assembly of the invention as seen from 6—6 in FIG. 2. Motor 20 is mounted on the floor of box 10. Clutch 68 is coupled to motor 20 and provides protection, as described, above. In the preferred embodiment of the invention, the motor used was a part number 2Z797 gear head "Dayton" brand motor as listed in the Spring 1981 W. W. Grainger catalogue on page 121. The motor is rated at 1/15 H.P. The clutch used is a Size No. 25 "Torque-Tamer" which is manufactured by the Dodge Manufacturing Company, Mishawaka, Ind. Clutch 68 is coupled to input member 22 and provides a "breakaway" function for safety and protection purposes. The other reference numerals in FIG. 6 are the same as those on FIGS. 2-5 and define elements which have already been described.

Figure 7:
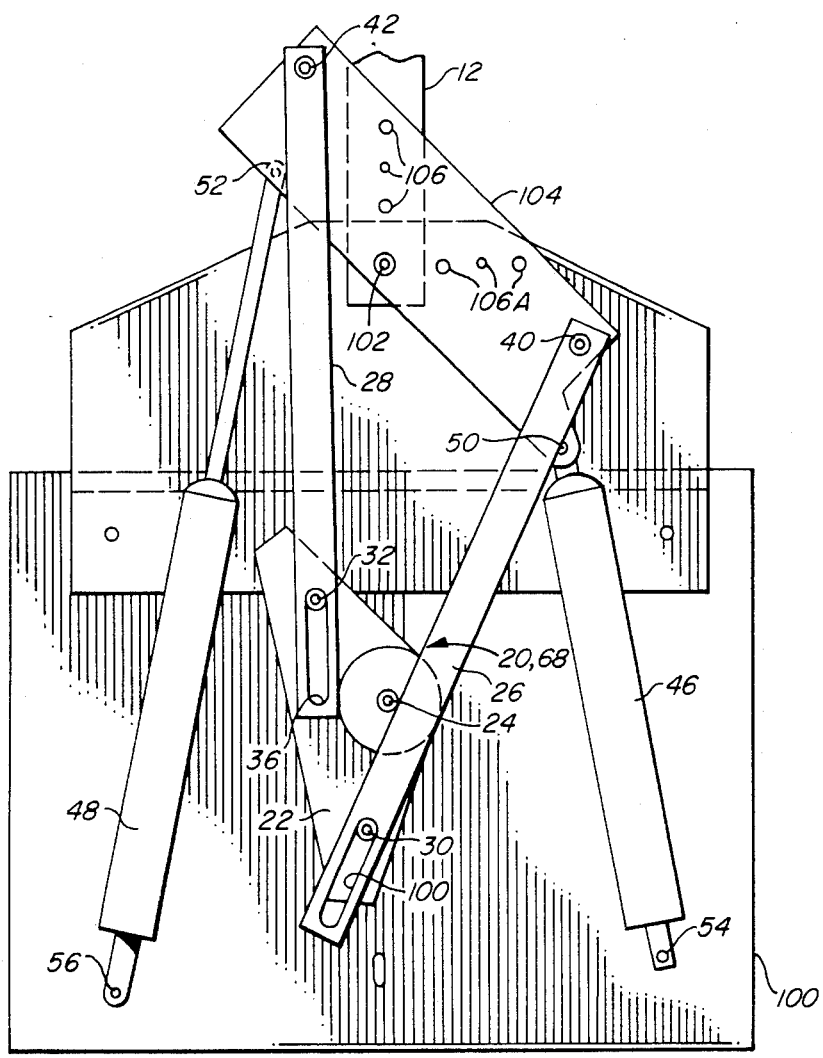
FIG. 7 is a top view of a top of post mounted version of the invention of FIG. 1.

FIG. 7 shows a plan view of another embodiment of the invention which allows the mechanism of the invention to be mounted on the post top of the post 100 from which gate 12 is pivoted 102. A major difference between the embodiment of FIG. 7 and the embodiment described above derives from the fact that there is no offset required between the gate and the mechanism in the embodiment of FIG. 7. The linkage apparatus of the invention is here mounted essentially in line with the plane of closed gate 12. The apparatus is almost exactly the same as that already described; the reference numerals are identical until the output member is addressed and it operates in exactly the same way to accomplish the same result. But because there is no offset required from gate 12 in this embodiment, the output member, bar 104, may be fastened in a fixed fashion, either by welding or preferably by bolting to an upper member of gate 12. Bolt holes 106 are provided for this purpose. Bolt holes 106A are also provided in case the installer needs to reverse the operation. This is the function which is accomplished in the prior described embodiment by fixing gate extender 62 to the opposite side of gate 12. (See, for example, FIG. 1, gate extender 62A, as shown in dotted line fashion.) As explained before, this change must be accompanied by a polarity reversal in the driving circuits for motor 20.

Some aspects of the complete gate operating system would be so obvious to one of ordinary skill in the art that they are not described or shown in any detail here. The motor controls and obviously required wiring will be well understood by one of ordinary skill. The actual control of the system may be through post or otherwise mounted activation switches 108 or via remote radio communications signals to radio receiver and antenna 110 (FIG. 1). Both of these techniques are so prevalent in the prior art that it is deemed unnecessary to further describe them here.

It will be obvious to one of ordinary skill in the art that bar members 26, 28 (see FIG. 2, for example) may be implemented without the use of slots 34 and 36, respectively. It is contemplated, by way of example, that substitutes for members 26, 28 might comprise telescoping tube structures with suitable built in stops to provide the function of the slotted members as taught herein. Another functional substitute for the slotted bar members might be a flexible linkage selected from rope, wire rope or cable, or even chain, to state a few examples, wherein the driving member 20 would be arranged so that the selected flexible substitution member would be placed in tension to produce the required output torque in output member 38. Therefore, it is contemplated that any method for altering the effective length of the driving member with respect to the non-driving member (in the context of members 26, 28) would come within my teachings and the claims which follow.

While the invention has been particularly shown and described with reference to preferred and other embodiments thereof, it will be understood by those skilled in the art that various modifications and changes may be made to the instant invention utilizing the principles of the invention as described herein without departing from the spirit and scope thereof as encompassed in the accompanying claims. Therefore, it is intended in the appended claims to cover all such equivalent variations as come within the scope of the invention as described.

I claim:

1. A dual four bar mechanism for translating a first torque to a second torque wherein the second torque is a non-linear function of the first torque, the mechanism comprising in combination:
   input means for actuation by the first torque;
   a dual input member, said dual input member being connected to and adapted for rotation by said input means;
   a first linkage element having a pivot and a slot along an axis of said first linkage element, said pivot and slot of said first linkage element being positioned at a first predetermined distance each from the other;
   a second linkage element having a pivot and a slot along an axis of said second linkage element, said pivot and slot of said second linkage element being positioned at a second predetermined distance each from the other;
   output means adapted for providing a torque to a rotary output device, one of said pivot and said slot of said first linkage element being engaged with a first pivot point of said output means, one of said pivot and said slot of said second linkage element being engaged with a second pivot point of said output means, the other of said pivot and said slot of said first linkage element being engaged with a first driving point on said dual input member and the other of said pivot and said slot of said second linkage element being engaged with a second driving point on said dual input member, said pivots of said linkages being pivotably engaged with their respective pivot points on one of said input member and said output means and said slots being both pivotably and slidingly engaged with their respective pivot points on the other of said input member and said output means.

2. The mechanism according to claim 1 wherein said input means comprises a clutch.

3. The mechanism according to claim 1 wherein the mechanism is adapted for mounting on a post top relatively higher than an output load, said output load being adapted for being driven by said output means of the mechanism.

4. The mechanism according to claim 2 wherein the mechanism is adapted for mounting on a post top relatively higher than an output load, said output load being adapted for being driven by said output means of the mechanism.

5. The mechanism according to claim 1 wherein said mechanism is adapted for mounting so that said output means is at a lower level than an output load, said output load being adapted for being driven by said output means of the mechanism.

6. The mechanism according to claim 2 wherein said mechanism is adapted for mounting so that said output means is at a lower level than an output load, said output load being adapted for being driven by said output means of the mechanism.

7. The mechanism according to claim 3 wherein said output means is adaptable for one of right-hand or left-hand operations from a closed position.

8. The mechanism according to claim 4 wherein said output means is adaptable for one of right-hand or left-hand operations from a closed position.

9. The mechanism according to claim 5 wherein said output load is a roadway gate and further comprises:
   gate extension means for providing a linkage pivot point which is offset from a plane of said gate, said gate extension gate; and
   means for linking said gate extension means to said output means.

10. The mechanism according to claim 6 wherein said output load is a roadway gate and further comprises:
    gate extension means for providing a linkage pivot point which is offset from a plane of said gate, said gate extension means being adaptable for mounting on one of two sides of said gate; and
    means for linking said gate extension means to said output means.

11. A dual four bar mechanism for translating a first torque to a second torque wherein said second torque is a non-linear function of the first torque, the mechanism comprising in combination:
    input means for actuation in both a first and a second direction by the first torque;
    dual input member means for connection to and adapted for rotation by said input means;
    dual output member means for providing the output torque;
    first linkage means for coupling between said input member and said output member means, said first linkage means for providing a mechanical coupling and a driving force to said output member means in response to said first direction of rotation of said input member means and said first linkage means adapted to be disengaged with respect to any mechanical coupling between said input member means and said output member means in response to said second direction of rotation of said input means; and
    second linkage means for coupling between said input member means and said output member means, said second linkage means for providing a mechanical coupling and a driving force to said output member means in response to said second direction of rotation of said input member means and said second linkage means adapted to be disengaged with respect to any mechanical coupling between said input member means and said output member means in response to said first direction of rotation of said input means; wherein said first linkage means is subjected to a compressive force to provide said driving force in response to said first direction of rotation and wherein said second linkage means is subjected to a compressive force to provide said driving force in response to said second direction of rotation.

12. The mechanism according to claim 11 wherein said input means comprises a clutch.

13. The mechanism according to claim 11 wherein the mechanism is adapted for mounting on a post top relatively higher than an output load, said output load being adapted for being driven by said output member means of the mechanism.

14. The mechanism according to claim 12 wherein the mechanism is adapted for mounting on a post top relatively higher than an output load, said output load being adapted for being driven by said output member means of the mechanism.

15. The mechanism according to claim 11 wherein said mechanism is adapted for mounting so that said output member means is at a lower level than an output load, said output load being adapted for being driven by said output member means of the mechanism.

16. The mechanism according to claim 12 wherein said mechanism is adapted for mounting so that said output member means is at a lower level than an output load, said output load being adapted for being driven by said output member means of the mechanism.

17. The mechanism according to claim 13 wherein said output member means is adaptable for one of right-hand or left-hand operations from a closed position.

18. The mechanism according to claim 14 wherein said output member means is adaptable for one of right-hand or left-hand operations from a closed position.

19. The mechanism according to claim 15 wherein said output load is a roadway gate and further comprises:
   gate extension means for providing a linkage pivot point which is offset from a plane of said gate, said gate extension means being adaptable for mounting on one of two sides of said gate; and
   means for linking said gate extension means to said output means.

20. The mechanism according to claim 16 wherein said output load is a roadway gate and further comprises:
   gate extension means for providing a linkage pivot point which is offset from a plane of said gate, said gate extension means being adaptable for mounting on one of two sides of said gate; and
   means for linking said gate extension means to said output means.

* * * * *